US010406418B2

United States Patent
Alon

(10) Patent No.: US 10,406,418 B2
(45) Date of Patent: Sep. 10, 2019

(54) DEVICE TO ATTACH CLIMBING HOLD TO FENCE

(71) Applicant: Raziel Solomon Alon, Woodland Hills, CA (US)

(72) Inventor: Raziel Solomon Alon, Woodland Hills, CA (US)

(*) Notice: Subject to any disclaimer, the term of this patent is extended or adjusted under 35 U.S.C. 154(b) by 0 days.

(21) Appl. No.: 15/462,854

(22) Filed: Apr. 25, 2017

(65) Prior Publication Data

US 2018/0304135 A1    Oct. 25, 2018

(51) Int. Cl.
| | |
|---|---|
| *A63B 69/00* | (2006.01) |
| *F16B 2/12* | (2006.01) |
| *A63B 71/02* | (2006.01) |
| *E06C 9/02* | (2006.01) |
| *E06C 9/06* | (2006.01) |

(52) U.S. Cl.
CPC ........ *A63B 69/0048* (2013.01); *A63B 71/022* (2013.01); *F16B 2/12* (2013.01); *E06C 9/02* (2013.01); *E06C 9/06* (2013.01)

(58) Field of Classification Search
CPC ......... A63B 69/0048; E06C 9/02; E06C 9/06; A47F 5/083
USPC ................. 248/925, 220.21; 482/35, 36, 37; 182/92, 228.1, 228.2, 228.3; 256/60
See application file for complete search history.

(56) References Cited

U.S. PATENT DOCUMENTS

| | | | | |
|---|---|---|---|---|
| 190,547 | A | * 5/1877 | Burke | ..................... E04H 17/16 256/31 |
| 1,880,423 | A | * 10/1932 | Eddy | ................... E04H 17/1434 256/67 |
| 4,249,635 | A | 2/1981 | West | |
| 4,582,284 | A | 4/1986 | Veenstra | |
| 4,842,230 | A | 7/1989 | Cobb | |
| 5,033,583 | A | 7/1991 | Candelaria | |
| 5,244,058 | A | * 9/1993 | Carlson | ..................... E06C 9/04 182/150 |
| 5,441,239 | A | * 8/1995 | Watson | ................... E04H 17/02 256/1 |
| 5,549,195 | A | * 8/1996 | Aulagner | ........... A63B 69/0048 198/850 |
| 5,626,244 | A | * 5/1997 | Mesna | ..................... A47F 5/083 211/60.1 |
| 5,749,765 | A | * 5/1998 | Stopperan | .............. A63H 33/40 24/5 |
| 6,074,327 | A | * 6/2000 | Franklin | ............ A63B 69/0048 248/231.9 |
| 6,551,216 | B2 | 4/2003 | Rennex | |
| 6,592,102 | B2 | 7/2003 | Telles | |
| 7,177,518 | B2 | * 2/2007 | Chun | ................... G08B 13/124 385/136 |
| 7,195,582 | B2 | * 3/2007 | Wu | ...................... A63B 22/001 198/850 |

(Continued)

FOREIGN PATENT DOCUMENTS

GB    2536113 A    * 9/2016

*Primary Examiner* — Eret C McNichols

(57) ABSTRACT

A system used to attach a climbing hold to a chain-link fence. In one embodiment, a backing plate (10) narrow enough to slide through the openings of a chain-link fence (12) is placed on the far side of the chain-link fence (12). A climbing hold (14) is placed on the nearside of the chain-link fence (12), and a bolt (16) is used to clamp the assembly together. Other embodiments are described and shown.

3 Claims, 3 Drawing Sheets

(56) References Cited

U.S. PATENT DOCUMENTS

| | | | |
|---|---|---|---|
| 7,250,020 B2 * | 7/2007 | Barbafieri | A63B 69/0048 482/23 |
| 7,331,881 B2 * | 2/2008 | Smith | A63B 63/083 473/481 |
| 7,419,457 B1 * | 9/2008 | Sudeith | A63B 9/00 482/35 |
| 7,434,661 B1 * | 10/2008 | Storey | E06C 1/36 182/100 |
| 7,520,837 B1 | 4/2009 | Sudeith | |
| 7,520,838 B1 * | 4/2009 | Sudeith | A63B 69/0048 482/35 |
| 7,523,899 B2 | 4/2009 | Cormier | |
| 7,594,874 B2 | 9/2009 | Meissner | |
| 8,322,667 B2 * | 12/2012 | Zannoni | A47G 23/0225 248/220.41 |
| 8,523,127 B1 * | 9/2013 | Bennett | A47F 5/083 211/85.7 |
| 9,201,291 B2 * | 12/2015 | Jorgenson | G03B 17/561 |
| 9,427,647 B2 * | 8/2016 | Moy | A63B 69/0048 |
| 9,681,781 B2 * | 6/2017 | Hurley | A47F 5/0876 |
| 2004/0069919 A1 * | 4/2004 | Studer | E04H 17/066 248/301 |
| 2005/0245355 A1 * | 11/2005 | Brewer | A63B 69/0048 482/37 |
| 2007/0082791 A1 | 4/2007 | Reese | |
| 2007/0090067 A1 * | 4/2007 | Holztrager | A47F 5/083 211/59.1 |
| 2007/0191188 A1 * | 8/2007 | Collins | A63B 69/0048 482/35 |
| 2011/0100939 A1 * | 5/2011 | Friesch | A63B 69/0048 211/85.7 |
| 2011/0319230 A1 * | 12/2011 | Brendle | A63B 23/03541 482/37 |
| 2015/0343288 A1 * | 12/2015 | Taggart | A63B 69/0048 482/37 |
| 2016/0339317 A1 * | 11/2016 | Moy | A63B 69/0048 |
| 2017/0144044 A1 * | 5/2017 | Tsang | A63B 69/0048 |

* cited by examiner

DEVICE TO ATTACH CLIMBING HOLD TO FENCE

BACKGROUND OF THE INVENTION

The following is a tabulation of relevant prior art:

| U.S. Patents | | | |
|---|---|---|---|
| Pat. No. | Kind Code | Publ. Date | Patentee |
| 7,594,874 | B2 | 2009 Sep. 29 | Meissner |
| 7,523,899 | B2 | 2009 Apr. 28 | Cormier |
| 7,520,837 | B1 | 2009 Apr. 21 | Sudeith |
| 6,592,102 | B2 | 2003 Jul. 15 | Telles |
| 6,551,216 | B2 | 2003 Apr. 22 | Rennex |
| 5,033,583 | A | 1991 Jul. 23 | Candelaria |
| 4,842,230 | A | 1989 Jul. 27 | Cobb |
| 4,582,284 | A | 1986 Apr. 15 | Veenstra |
| 4,249,635 | A | 1981 Feb. 10 | West |

| U.S. Patent Application Publications | | | |
|---|---|---|---|
| Publication Nr. | Kind Code | Publ. Date | Applicant |
| 20070082791 | A1 | 2007 Apr. 12 | Reese |

Rock climbing is an increasingly popular hobby and recreational activity. At different skill levels, climbing can serve as intense physical training or as entertainment for children. To serve the growing audience of climbers, artificial climbing walls are built. Many of these artificial climbing walls are large steel frameworks on to which plastic climbing holds are attached. Such climbing walls can be found in climbing gyms, which are large warehouses filled with such walls, or, in a miniature form, in playgrounds for children to play on.

Examples of such climbing structures can be found in U.S. Pat. No. 7,520,837 and Patent Application 20070082791. Both describe outdoor climbing structures that can be constructed and anchored to the ground to allow recreational climbers and children to climb as a playground activity. Unfortunately, these playgrounds can be expensive and take up a lot of space. One must build dedicated structures for these playgrounds. These structures are expensive to build and few recreational climbers and children get access to such climbing walls.

Another example of a novel climbing structure is disclosed in U.S. Pat. No. 6,551,216, which describes a netlike climbing structure that can offer variable climbing routes. The structure is assembled in the form of a large tent with a tall center pole that multiple layers of nets are draped over. The structure would also require a large investment in space and equipment since a user would need to acquire a large set of nets and poles and then install the equipment into a dedicated space.

Prior art also exists in the form of inventions intended to hang ornaments from chain-link fences. U.S. Pat. No. 4,582,284 describes a cruciform-shaped device with a hook intended to hang clothing and tennis equipment from chain-link fences. That device would not be able to withstand the dynamic forces of a climbing hold, including those forces that a climber can impart by hanging or pulling on the hold, and which may knock the hook out of the chain-link fence.

U.S. Pat. No. 7,523,899 describes a bracket that offers a mounting position for signage and does not foresee the combination of the bracket mount with a climbing hold. The bracket lacks a handful of characteristics necessary to function as a climbing hold attachment device. One issue is that the flat flange depicted in that patent would not properly mate with the uneven surface of a chain-link fence. A second issue is that the sign clamps onto the raised boss of the bracket before the sign touches the fence. This does not prevent the sign from moving relative to the fence. If a climbing hold were to be used with that device, the dynamic forces from the climbing hold would shift the device from side to side. Also, the device requires simultaneous access to both sides of the fence so that one can place the mounting block on the far side while screwing the sign in from the near side.

SUMMARY OF THE INVENTION

In accordance with one embodiment, the present invention comprises a threaded plate that nests in the diagonal channel on the backside of a chain-link fence. The plate mates with a bolt that passes through the fence and clamps a climbing hold to the front side of the fence. The threaded plate can be designed such that, during installation, it will fit through the front side of the fence, allowing a user to install the device and attach the climbing hold without access to the back side of the fence. Users can attach any quantity of these devices to the fence to create an array of climbing holds with nearly a limitless number of possible configurations.

ADVANTAGES

Accordingly, several advantages of one or more aspects of the present invention are that it creates a new, recreational use for fences; decreases the cost and space required to set up a recreational climbing wall; allows users to set up fun and engaging climbing sequences that can accept the multi-directional pull of a climber; and works with both standard and custom climbing hold hardware.

Figure 1:
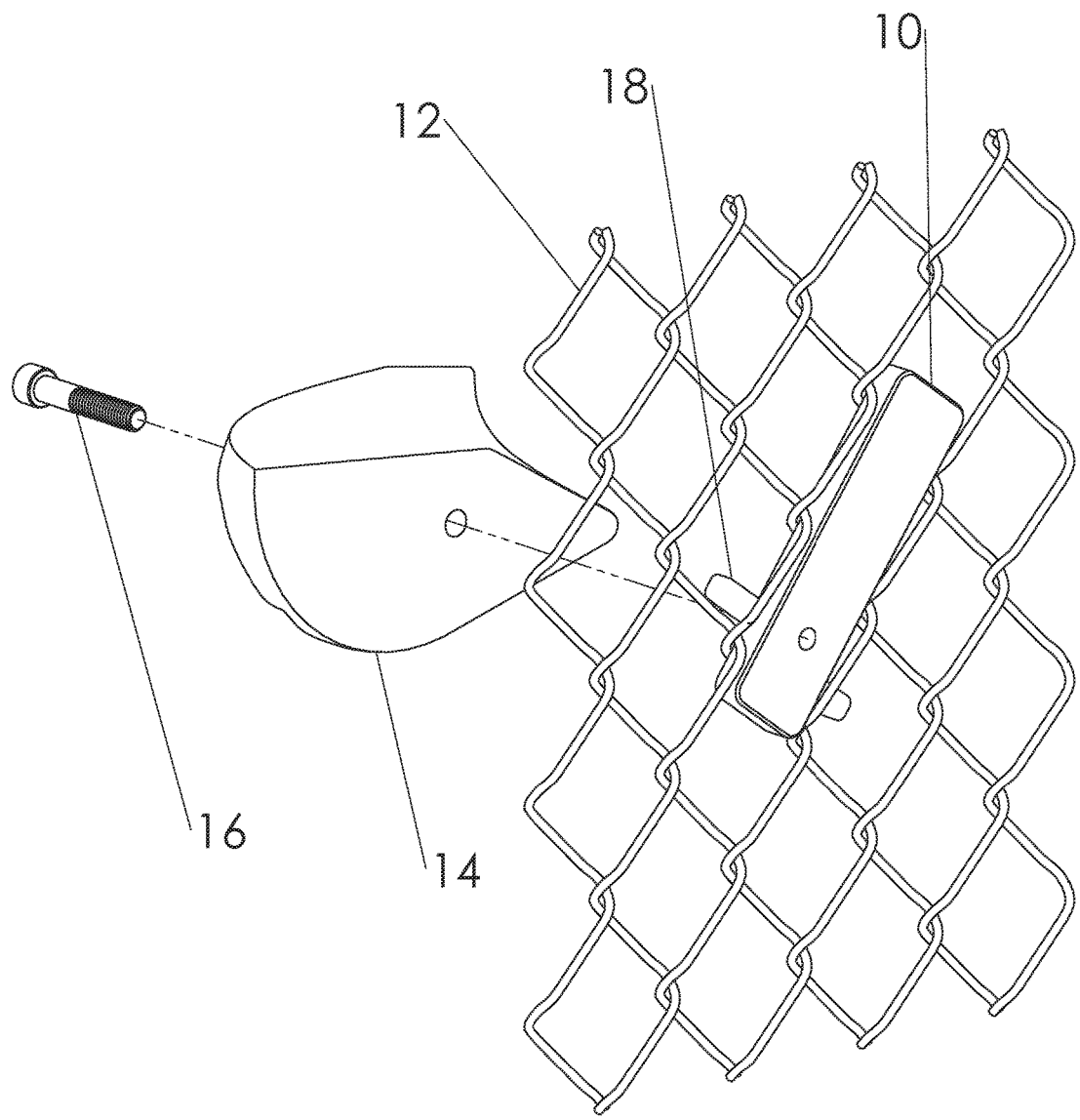
FIG. 1 shows an exploded view of a device supplied with a large climbing hold in accordance with one embodiment.

DRAWINGS—REFERENCE NUMERALS 10 backing plate
12 chain-link fence
14 large climbing hold
16 bolt
18 detachable retaining arm
20 integrated backing plate
22 integrated retaining arm
24 small climbing hold
26 front plate

DETAILED DESCRIPTION

One embodiment of the device is illustrated in FIG. 1, an exploded view. In this embodiment, a backing plate 10 is installed behind a chain-link fence 12. The fence 12, is made up of interwoven wires and has a plurality of openings. A large climbing hold 14, large enough to contact the fence at three or more points, is placed on the front side of the fence.

Bolt 16 clamps and holds the assembly in place by going through the climbing hold 14, through any of the openings of the fence 12 and into the threaded hole of the backing plate 10. A detachable retaining arm 18, is connected to the backing plate 10, at an angle generally perpendicular to the length of the backing plate 10. The retaining arm 18 prevents the backing plate 10 from falling behind the fence during installation and removal.

Figure 2:
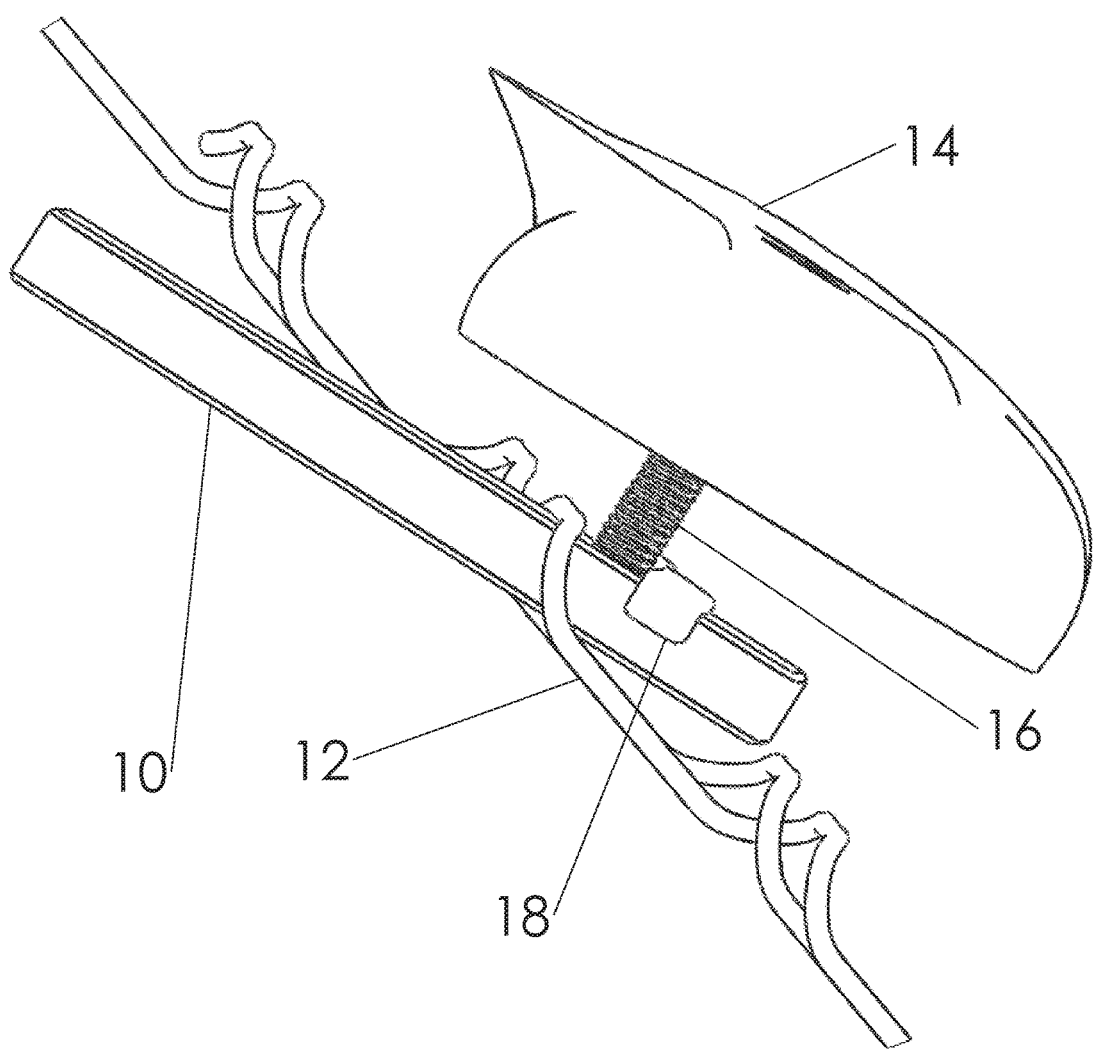
FIG. 2 shows a side view of the device being inserted through the chain-link fence at an angle in accordance with another embodiment.

FIG. 2 shows the device mid-installation during one possible installation method. In this installation method, the backing plate 10, the bolt 16, and the climbing hold 14 are preassembled. The bolt 16 is kept loose enough that the backing plate 10 can slide through one of the openings of the fence 12. In this embodiment, the shorter end of the backing plate 10, is designed so that the distance from the far edge of the bolt 16 to the short end of the backing plate 10 is smaller than the opening of the fence 12. This allows the backing plate 10 to slide completely past the fence 12, at which point it can be slid in the opposite direction so that the short end of the backing plate 10 hooks onto the back edge of the opening. Once in place, the bolt 16 can be tightened so that the climbing hold 14 is fixed to the front surface of the fence 12.

In one possible uninstallation method, the reverse order of operations can be used. First, the bolt 16 is loosened. Then the device is slid upwards so that the short edge of the backing plate 10 is freed into the opening of the fence 12. Finally the device can be angled out and removed from the fence 12.

In an alternative installation method, backing plate 10 can be slid behind the fence 12 as an individual member. Retaining arm 18 can keep the backing plate 10 from falling to the ground. This frees both hands of whomever is installing the device. With the backing plate 10 in place, the bolt 16 is placed through the climbing hold 14, through the fence 12, and then threaded into the backing plate 10.

In one embodiment, the backing plate 10 rests in the diagonal channel on the backside of the fence 12. Here, the diagonal channel of fence 12 prevents the backing plate 10 from rotating while the bolt 16 is tightened.

In an alternative uninstallation method, the bolt 16 and the climbing hold 14 can be completely removed from the backing plate 10. At this point, retaining arm 18 keeps the backing plate 10 in place. Once the bolt 16 and the climbing hold 14 are removed, the backing plate 10 and the retaining arm 18 can be slid through the opening of the fence 12.

Other installation and uninstallation methods are possible, and the aforementioned methods are not in any way limiting of the device.

The openings of fence 12 can vary in size. For instance, standard fences used in tennis courts or at school playgrounds can have openings in a generally square shape with sides of length generally ranging from about 38 mm (1.5 inches) to 63 mm (2.5 inches). Sizes beyond the aforementioned range are also possible. In general, if the backing plate 10 is narrower than the opening of the fence 12, then the backing plate can slide through the opening. In different embodiments, the width of the backing plate 10 can be made wider or narrower to account for openings of different sizes, including opening beyond the standard sizes.

Figure 3:
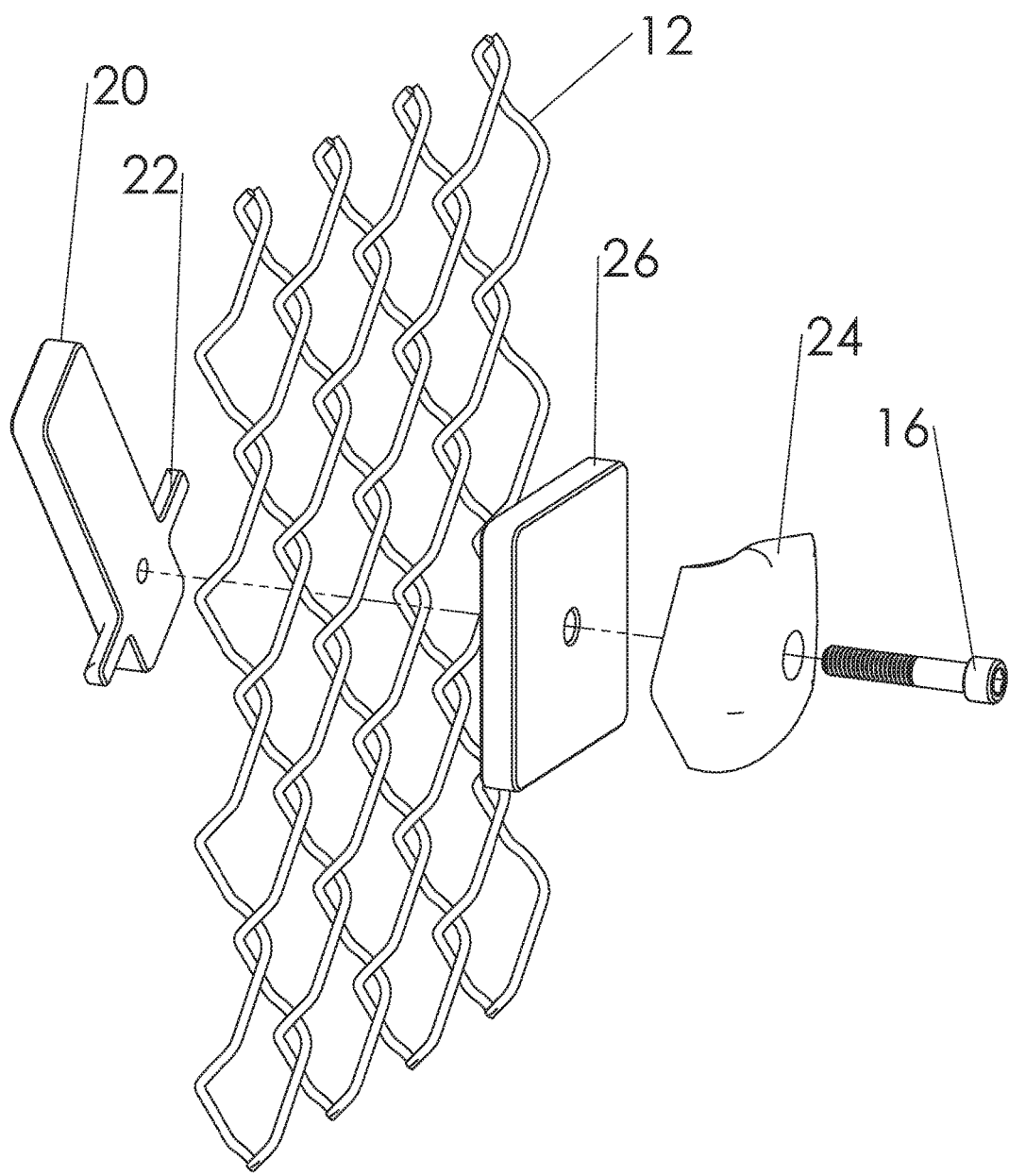
FIG. 3 shows an exploded view of the device supplied with a small climbing hold and a front plate in accordance with another embodiment.

In FIG. 3, an alternative embodiment of the device is shown. Here, integrated backing plate 20 and integrated retaining arm 22 are a monolithic element that function similarly to the backing plate 10 and the retaining arm 18 shown in FIG. 1A. The bolt 16 threads though the integrated backing plate 20 to clamp the small climbing hold 24 and the front plate 26 to the fence 12. The front plate 26 is added to the assembly so that a small climbing hold 24 can spread the clamping force onto multiple points of the front of the fence 12. Installation and uninstallation for this embodiment can be similar to that of the embodiment shown in FIG. 1.

As seen in FIG. 1, the tightening of the bolt 16 holds the device firmly to the fence 12. The firm attachment allows for rigid, multi-directional pulling on the climbing hold 14. If a climber is to pull and apply a force outwards, the force transfers from the climbing hold 14, through the bolt 16, to the backing plate 10, which can then transfer the force to the fence 12. In response to downward, left, right, and upward forces, the device is held in place by the friction created by the clamping force between the bolt 16, the climbing hold 14, and the backing plate 10. When a force pushes the climbing hold 14 toward the fence 12, the climbing hold 14 directly transfers the force into any points of contact with the fence 12.

The device can be installed in many orientations. FIG. 1 shows the device installed with the climbing hold 14 facing up. To change the angle of the climbing hold 14, a user can loosen the bolt 16 and then rotate the climbing hold 14 around the axis of the bolt 16. Once the user determines their preferred orientation, they can retighten the bolt 16, thus locking the climbing hold 14 at the new angle. To change the placement of the device, the device can be removed from one opening of the fence 12 and installed into any other opening. Because the climbing hold 16 can be rotated and the device can be moved to any opening, the climbing hold 14 can be placed in many orientations.

Conclusions, Ramifications, and Scope

Accordingly, the reader will see that the device to attach climbing holds to fences creates a new, recreational use for fences by allowing users to install one or more climbing holds to the fence. Furthermore, the device is capable of being integrated with standard climbing equipment or being designed with custom holds and hardware.

Although the description above contains many specificities, these should not be construed as limiting the scope of the embodiments but as merely providing illustrations of some of several embodiments.

For example, the two halves can be clamped together with many different style bolts including, but not limited to, self-tapping screws, machine screws of all sizes, or a bolt with security type heads.

In other examples, the front plate can be customized to have extra features including, but not limited to, an edge that can be utilized as a climbing hold, a plurality of threaded features to attach extra climbing holds to, or a countersunk through-hole to allow for a flathead bolt to lie flush with. The front plate can also be made to allow for climbing holds to screw directly into the front plate. Further, it could have a hole that could be used to attach carabiner, lanyards, or anchors to. Also, the front panel can be used with holds of any size, small or large. There is no limit to the size of the front panel. In some cases, very large front panels can be incorporated to attach many small holds too, or a large front plate may be used to keep climbers from grabbing behind the climbing hold. The front plate can also have informational or educational graphics on any of its faces.

The components of this invention can be made of a wide range of materials including but not limited to plastic, wood, or metal. Backing plates made from wood or plastic can be fortified by placing threaded inserts.

The retaining arm is shown as one possible method to prevent the backing plate from falling through the fence. Other embodiments could exist, such as embodiments resembling a binder clip or an alligator clip that would hook onto the adjacent wire of the chain-link fence. In another embodiment, the retaining arm could be replaced with a wire or rope that attaches the climbing hold or front plate to the backing plate.

I claim:

1. A device to attach a climbing hold to a fence having a front, a back, and a plurality of openings bounded by wires, said device comprising:
   a. a backing plate having a threaded hole, the first and second ends that are sufficiently narrow to pass through one of said openings from said front of said fence and to rest in a diagonal channel of said back of said fence, and sides that are sufficiently long to extend over a combined length of at least two of said openings and to engage said diagonal channel along said combined length so that a load on said backing plate is distributed sufficiently along said fence to support the weight of a climber,
   b. means for clamping said climbing hold and said backing plate together and onto said fence by joining said climbing hold and said threaded hole of said backing plate after said backing plate is passed through said opening and placed on said back of said fence and said climbing hold is placed on said front of said fence, and
   c. retaining arms extending from and generally perpendicular to said sides of said backing plate and extending sufficiently far therefrom to extend past the wires adjacent to said sides of said backing plate when said backing plate rests in said diagonal channel, said retaining arms being positioned on said backing plate so that said retaining arms rest against said front of said fence while said ends rest against said back of said fence, and said retaining arms being located sufficiently near said second end of said backing plate such that a user can pass said first end of said backing plate through said opening from said front of said fence until said retaining arms contact the wires of said opening, at which point said second end can pass through said opening so that both said ends rest in said diagonal channel of said back of said fence while said retaining arms remain on said front of said fence, whereby said retaining arms prevent said backing plate from falling away from said fence before said means for clamping is attached.

2. The device of claim 1 wherein the threaded hole of said backing plate is located near enough to said second end of said backing plate such that, after said first end of said backing plate is passed though said opening, said second end of said backing plate can pass through said opening in said fence with a bolt installed in said threaded hole.

3. A method of attaching a climbing hold and a backing plate to a fence having a front, a back, and a plurality of openings bounded by wires, said backing plate having first and second ends, first and second sides, a threaded hole, and retaining arms extending from said sides of said second end, said method comprising
   a. passing said first end of a backing plate through one of said openings from said front of said fence to said back of said fence until said retaining arms contact said wires of said fence,
   b. passing said second end of said backing plate through said opening while said retaining arms remain on said front of said fence such that said retaining arms and said backing plate can remain in position on said fence without additional need for support,
   c. placing a climbing hold on said front of said fence,
   d. joining said climbing hold and said threaded hole of said backing plate by means of a bolt, and
   e. tightening said bolt to securely clamp said climbing hold and said backing plate together on opposite sides of said fence.

* * * * *